United States Patent Office 2,906,787
Patented Sept. 29, 1959

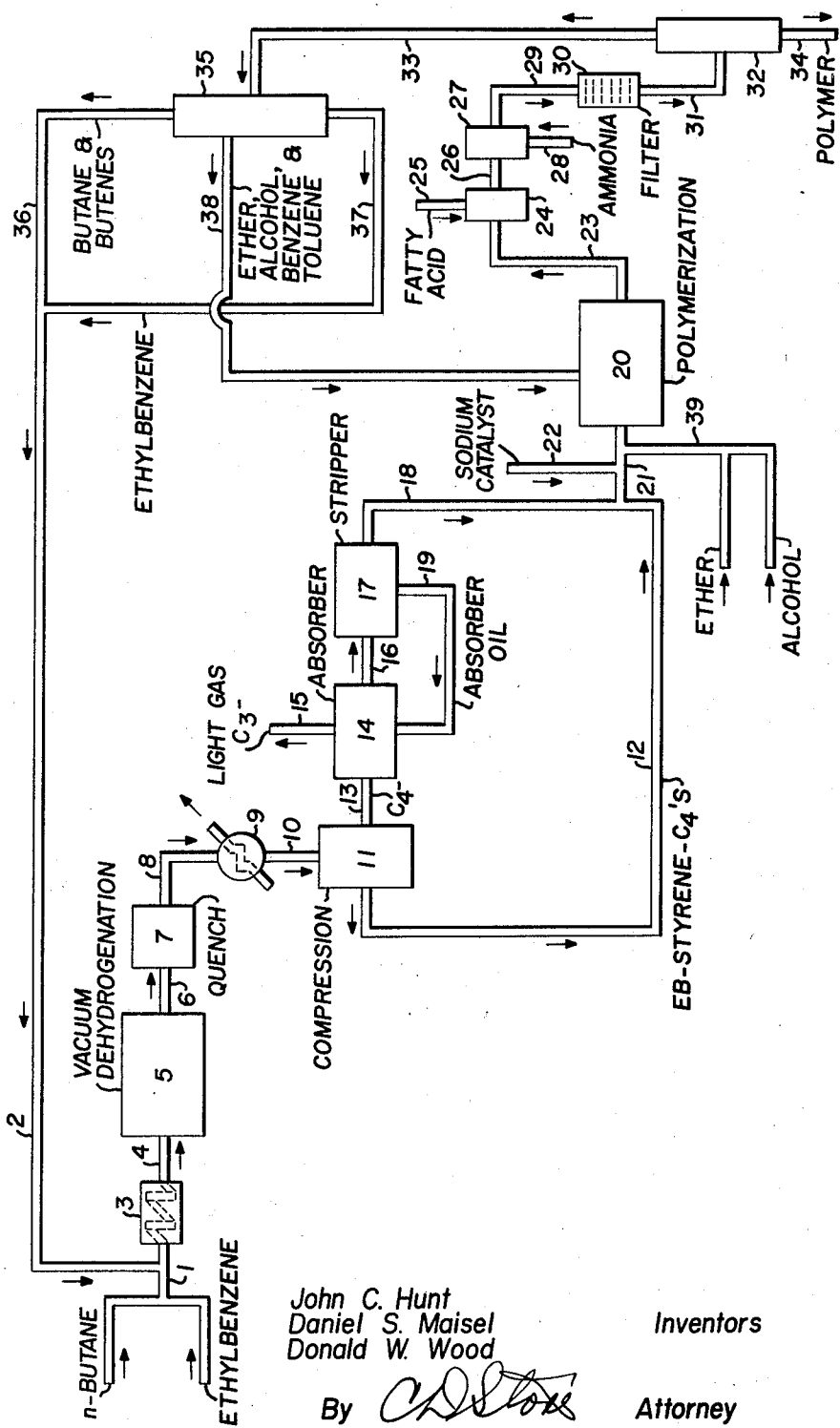

2,906,787

PREPARATION OF DRYING OILS BY THE POLYMERIZATION OF THE PRODUCTS FROM THE CODEHYDROGENATION OF BUTANE AND ETHYL BENZENE

John C. Hunt, Linden, Daniel S. Maisel, Union, and Donald W. Wood, Highland Park, N.J., assignors to Esso Research and Engineering Company, a corporation of Delaware Application November 23, 1955, Serial No. 548,573

2 Claims. (Cl. 260—669)

This invention relates to a unitary process for the production of copolymers of butadiene and styrene. In one preferred embodiment the invention relates to the use of a series of steps carried out under conditions adapted to form a finished liquid polymer of low cost. Some of the specific aspects of the invention pertain to process steps involving the direct production of a feed stock containing the desired ratio of butadiene and styrene combined with certain other steps for copolymerizing the feed mixture as formed.

The preparation of polymers by the alkali metal polymerization of butadiene or copolymerization of butadiene and styrene is well known. The products range from liquid materials to rubberlike polymers. It has generally been considered necessary to use substantially pure feed materials. The removal of impurities from the butadiene greatly increases the cost of the product.

Likewise the purification of styrene offers problems difficult to solve. Because of concurrent polymerization styrene cannot be distilled at its atmospheric boiling point. Even under vacuum it is necessary to add a polymerization inhibitor and to use a column of special design due particularly to the necessity for separating between styrene and ethylbenzene which boil only 9° C. apart. While relatively trouble-free operation can be attained by distilling styrene in a system which never allows the concentrated monomer to exceed 90° C. in temperature, mistakes can easily be made and the results are very severe since a thoroughly plugged column is costly to clean.

It is therefore one object of this invention to provide a low cost process for preparing liquid copolymers of butadiene and styrene.

A further object of this invention is to provide a unitary process for preparing and copolymerizing a mixture of butadiene and styrene which avoids the necessity for purifying the individual monomers.

Other objects of the invention will be apparent to one skilled in the art from the accompanying discussion.

These and other objects of the invention are accomplished by dehydrogenating a mixture of n-butane or butene-1 or butene-2 or mixtures thereof and ethylbenzene under conditions to give a mixture of butadiene and styrene in the desired proportions at high yields and the polymerization of the mixture thus obtained. Unconverted butane, butene and ethylbenzene present in the polymerization mixture are separated from the product and recycled. The cost of recovering pure butadiene and separating ethyl benzene and styrene are thus eliminated and substantial savings in the preparation of the feed stocks to the polymerization thus obtained.

In order to make the invention more clearly understood, there is shown in the accompanying drawing one means for carrying the same into practical effect.

Referring now to the drawing, a mixture of n-butane and ethylbenzene is introduced through line 1, combined with recycle n-butane, butenes, and ethylbenzene from line 2, and passed into preheater 3 where the combined streams are heated to 500–1150° F. The total feed is then passed by line 4 to a catalytic dehydrogenation unit 5 operating at a pressure of 2–10 p.s.i.a. and at a temperature of 1150–1450° F.

The dehydrogenation is preferably carried out in a vacuum transfer line reactor as described in the following patent applications: Serial Nos. 503,456, filed April 25, 1955, now U.S. Patent No. 2,820,072; 469,344 filed November 17, 1954; and 423,598, filed April 16, 1954, now U.S. Patent No. 2,722,476. A particularly suitable catalyst would be of the well-known chromia-alumina type. However, if butene were fed in place of butane, steam diluent could be used to obtain low hydrocarbon partial pressure. In this case, the catalyst could be a mixture of 72.4% magnesium oxide, 18.4% of iron oxide, 4.6% of copper oxide and 4.6% of potassium oxide. In a transfer line system, the reactant vapor and catalyst pass upflow at high velocity (5–100 ft./sec.) through a small diameter reactor for a uniform short reaction period (0.1–2.0 sec.), after which the catalyst is quickly removed in short-time centrifugal separators.

The product vapors are quickly quenched and the solids pass to a regenerator where carbon deposits are removed by combustion with air. The regenerated catalyst is then returned to the reaction zone. The solids flow and temperature are regulated to supply the heat of dehydrogenation and the sensible heat needed to raise the feed to reaction temperature. By use of a transfer line system, the dehydrogenation reactions can be carried out at very high conversion levels by operating at high temperatures and very short contact times. Product yields are therefore higher than can be obtained in conventional low temperature fixed bed dehydrogenation units. It is also possible to control the concentration of butadiene and styrene in the polymerization feed by varying the temperature and contact time in the transfer line system. For example, the butadiene-styrene concentration in the outlet from the dehydrogenation unit is 14.5 wt. percent when the dehydrogenation unit operates at 1150–1300° F. and 1.0 to 2.0 sec. contact time and 28 wt. percent at 1300–1400° F. and a contact time in the range of 0.1 to 1.0 sec.

The products of dehydrogenation consisting of butadiene, styrene, ethylbenzene, n-butenes, n-butane, toluene, benzene and light gases are removed from the dehydrogenation unit 5 via line 6 and quenched in tower 7 by direct contact with a hydrocarbon oil to a temperature in the range of 300–800° F. where undesirable cracking and condensation reaction rates are negligible. The products are removed through line 8 and are further cooled to 100° F. by indirect contact with water in heat exchanger 9 and passed through line 10 to a series of compression stages 11 where the major portion of the product is liquefied and withdrawn through line 12. The light gases are withdrawn by line 13 and scrubbed with oil in absorber 14 to recover the $C_4$'s. The $C_3^-$ products are removed from the system through line 15. The absorbate is fed by way of line 16 to stripper 17 where the $C_4$'s are separated from the oil by line 18. The oil is recycled to absorber 14 via line 19. The $C_4$'s in line 18 are combined with liquefied product from line 12 and fed to the polymerization unit 20 through line 21, where it is polymerized in the presence of 1.2 to 8 parts of a finely divided alkali metal catalyst, preferably sodium, per 100 parts of butadiene and styrene, preferably 2 to 5 parts. Other suitable catalysts include potassium, lithium, caesium, rubidium or their mixtures or alkyl compounds.

A desirable modification of the process involves the use of a substantial amount of certain ethers as codiluents or modifiers. The ethers may be blended with the feed stream as through line 39 along with a small amount of alcohol as discussed further below. The ethers function in varying ways to control the reaction rate, to improve product color or to control product viscosity. The choice of the particular ether used will depend on the particular type of modification desired. A particular outstanding promoter for the batch process has been found in dioxane-1,4, whose presence in the feed aids in the production of a colorless product of desirable viscosity and good drying properties, and promotes the reaction sufficiently to give 100% conversion at 50° C., in a period of about 5–10 hours. Similarly favorable results were also obtained with diethyl ether $(C_2H_5)_2O$, methylal, ethylal, methyl acetal, and t-butyl methyl ether. In the batch process, diethyl ether is usable, although the initial induction period tends to be somewhat long. However, diethyl ether is the preferred ether in a continuous process as the difficulty in starting up the reaction occurs only at the beginning of the polymerization which runs for a long period of time in contrast to batch runs which have to be started up. Diethyl ether is less subject to undesirable side reactions with metallic sodium, and it is a more vigorous promoter than dioxane. Other ethers useful to a still lesser extent are diethyl acetal, vinyl isobutyl ether, dihydropyrane and ethylal, all of which have a favorable effect on improving the color of the product.

Finally, all cyclic ethers having an —O—C—O— group in a ring structure, such as dioxane-1,3, dioxolane, paraldehyde and glycol ethylidene diacetal, inhibit the polymerization rate so excessively that their use is impractical. Thus, the cyclic ethers must have the oxygen atoms separated by at least two carbon atoms.

The ether is used in amounts ranging from about 1 to 100 parts, preferably 5 to 50 parts by weight per 100 parts of monomers. If a hydrocarbon diluent other than the non-butadiene and non-styrene components of the effluent from the dehydrogenation is used, it is especially desirable in many cases to select an ether having a boiling point of at least 10° C., below the lower limit of the boiling range of the hydrocarbon diluent, and thus, when using a mineral spirits having a boiling range of 150° C. to 200° C., ether co-diluents boiling between about 25 and 140° C. are preferred for the reason that their separation from the hydrocarbon diluent in the polymerized reaction mixture is greatly facilitated by virtue of the stated difference in boiling points.

It is also advantageous to use about 10 to 50%, preferably 10 to 30 weight percent (based on alkali metal), of an alcohol in the polymerization recipe. Suitable alcohols include isopropanol, isobutanol, isopentanol, secondary butanol, and tertiary butanol. The coarser the catalyst dispersion, the more essential it is to have a sufficient amount of alcohol promoter present.

The reaction time and induction period vary depending on the degree of catalyst dispersion, reaction temperature, moisture content of the system and the sequence of monomer addition.

It is preferred to operate with a catalyst particle size of about 1 to 50 microns, preferably from 20 to 40 microns. Such a catalyst can be prepared by dispersing the molten alkali metal in a hydrocarbon such as Varsol or preferably ethyl benzene by means of a homogenizer such as an Eppenbach Homo-mixer and cooling the resulting dispersion below the melting point of the alkali metal to prevent coalescence of the dispersed metal particles.

The catalyst is fed to the reactor through line 22 and is usually a slurry of metal particles dispersed in 2 to 200 parts by weight of a hydrocarbon liquid such as Varsol or ethyl benzene. Agitation of the reaction mixture during synthesis increases the efficiency of the catalyst.

The polymerization unit may consist of several stages. It is preferable to initiate the continuous process by first charging the first stage of the reactor and batch reacting the charge until the reaction has reached a relatively high conversion level, for example, of about 50 to 80%, and then beginning the continuous or intermittent addition of reactant, solvent, modifiers and catalyst. The reaction is continued in the first stage until the conversion levels off, after which the reactants are passed to the second vessel and additional feed, solvent, modifier and catalyst added if desired. The reaction is continued in this vessel or stage at a higher conversion level than in the first stage. Stages following the first are desirably operated at higher temperatures than the first stage. The reactants are passed to as many subsequent stages as needed to obtain essentially complete conversion. A total of 3 to 6 stages is typical.

The effluent from the polymerization unit is removed through line 23 and passed to vessel 24 where destruction of catalyst at the end of the reaction is effectively accomplished by adding to the reaction mixture by line 25 a moderate excess of an anhydrous $C_1$ to $C_5$ fatty acid which is soluble in the hydrocarbon mixture, e.g. acetic or pentanoic. After destruction of the catalyst the crude polymerization product containing the salts, excess acid and other impurities passes through line 26 to vessel 27 where it is neutralized with ammonia added by line 28. The neutralized product passes through line 29 to filter 30 where it is filtered preferably with a filter aid such as silica gel, clay, charcoal or its equivalent. Separation can also be accomplished by centrifuging, if desired. Other ways of destroying the catalyst may be used, such as by adding alcohol, or inorganic acids.

Effluent from the filter is removed through line 31 and passed to distillation unit 32 where vapors of butane, butenes, ether modifier, isopropyl alcohol, ethylbenzene, benzene and toluene are taken overhead through line 33. Polymer product is withdrawn from the bottom through line 34 and sent to storage. Overhead vapors in line 33 are passed to a second distillation zone 35 where light products such as butane (B.P. —.55° C.) and butenes (B.P. —7 to +4° C.) and any unreacted butadiene (B.P. —4.5° C.) are removed overhead through line 36 and ethylbenzene (B.P. 136° C. and any unreacted styrene (B.P. 145° C.) are removed from the bottom through line 37. Ether diluent, e.g. dioxane (B.P. 101° C.) or ethyl ether (B.P. 35° C.), isopropyl alcohol (B.P. 82° C.) and any by-products from the dehydrogenation step such as benzene (B.P. 80° C.) and toluene (B.P. 111° C.) are removed as a side stream through line 38 and recycled to the polymerization zone 20. The bottom and top products flowing in lines 36 and 37 respectively, are combined and recycled to the dehydrogenation step by line 2.

Depending on the amount and type of ether used, the product removed through line 34 is a clear, colorless to light yellow composition having a viscosity of about 0.20 to 20 poises, preferably 0.5 to 10 poises at 50% N.V.M. when dissolved in a hydrocarbon diluent having a specific gravity of about 0.79, such as Varsol.

Since various changes may be made in carrying out the above process without departing from the scope of the invention, it is intended that all matter contained in the foregoing description of the invention shall be interpreted as illustrative and not as limiting. For example, it may be desirable to carry out the dehydrogenation of butane in two steps or to use a $C_4$ cut obtained from catalytic cracking as the paraffinic portion of the feed to the dehydrogenation unit. If the two-stage dehydrogenation process is used the butane will be dehydrogenated to butene in a separate unit and the feed to the combined dehydrogenation unit will be butene-1 and/or butene-2 and ethylbenzene.

This application is a continuation-in-part of application Serial No. 503,456, filed April 25, 1955, now Patent No. 2,820,072.

The nature of the present invention having been thus full set forth and specific examples of the same given, what is claimed as new and useful and desired to be secured by Letters Patent is:

1. A continuous process for preparing a synthetic drying oil from impure reactants which comprises catalytically dehydrogenating a mixture of ethylbenzene and a hydrocarbon chosen from the group consisting of n-butane, butene-1, butene-2, and mixtures thereof; controlling said dehydrogenation by varying the temperature between 1150° and 1450° F. and contact time between 0.1 and 2.0 seconds to form a mixture containing between 14.5 and 28.0 weight percent of butadiene and styrene in an admixture with ethylbenzene, n-butane, n-butene, toluene and benzene; subjecting said mixture without separation and without purification of the butadiene and styrene to polymerization in the presence of about 1.2 to 8 parts of a finely divided alkali metal per 100 parts by weight of monomer to form an oily polymer, controlling the polymerization with about 1 to 100 parts by weight of an ether per 100 parts by weight of a monomer, said ether being selected from the group consisting of lower aliphatic ethers and dioxane-1,4; separating unreacted materials from said polymer; and recycling said unreacted materials to said dehydrogenation zone.

2. Process according to claim 1 in which the polymerization step is carried out in the further presence of between about 10 to 50% by weight based on the alkali metal of an aliphatic alcohol having 3 to 5 carbon atoms in the molecule.

References Cited in the file of this patent

UNITED STATES PATENTS

| | | |
|---|---|---|
| 2,376,549 | Mavity | May 22, 1945 |
| 2,459,126 | Clifford | Jan. 11, 1949 |
| 2,672,425 | Gleason et al. | Mar. 16, 1954 |
| 2,795,631 | Nelson et al. | June 11, 1957 |